May 28, 1940.  J. F. KENNEDY  2,202,781
STEERING WHEEL INSTRUMENT PANEL
Filed May 11, 1939
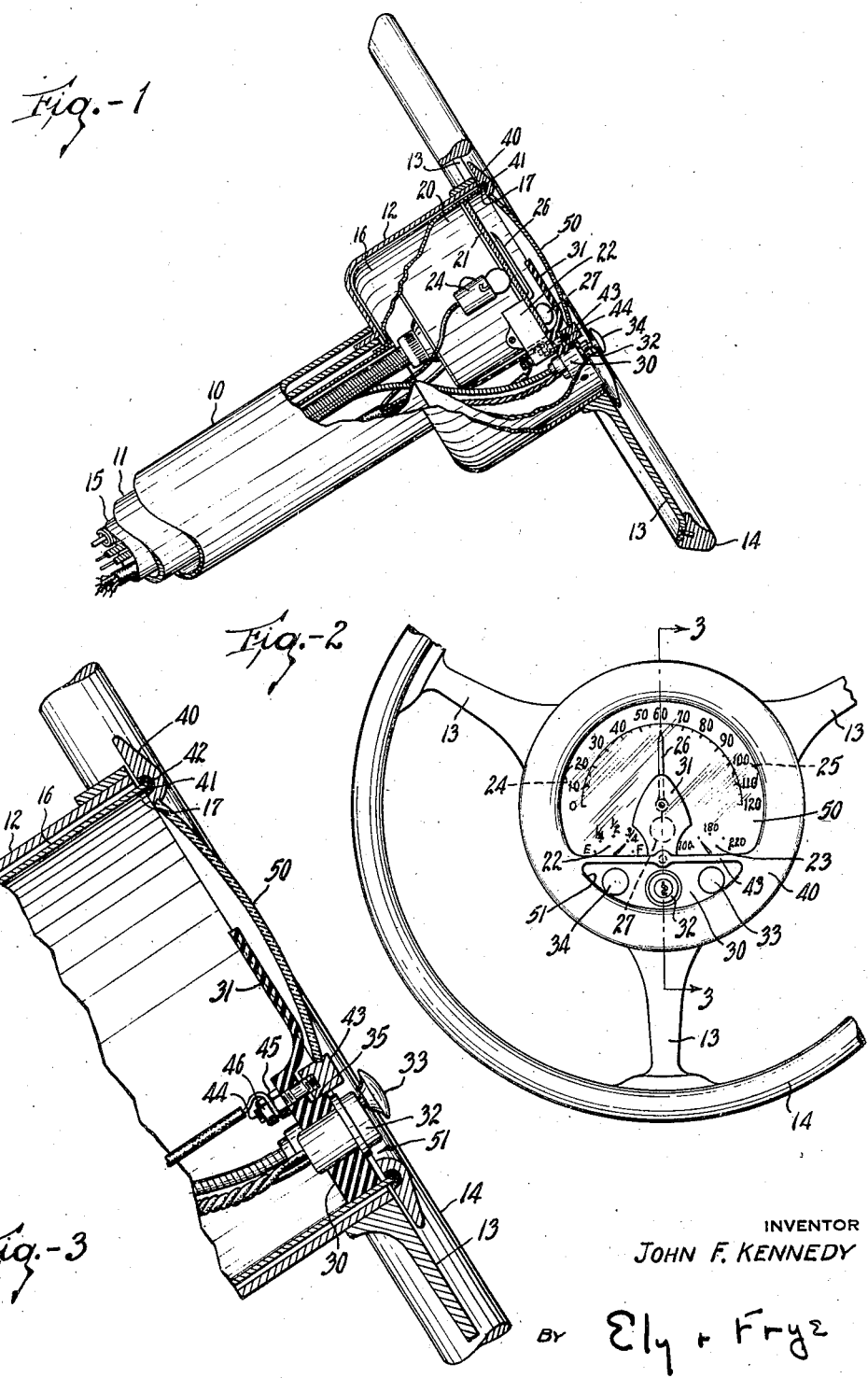
INVENTOR
JOHN F. KENNEDY
BY Ely + Frye
ATTORNEYS Patented May 28, 1940

2,202,781

UNITED STATES PATENT OFFICE 2,202,781

STEERING WHEEL INSTRUMENT PANEL

John F. Kennedy, East Cleveland, Ohio, assignor of thirty-three and one-third per cent to Frances Minardi and thirty-three and one-third per cent to John F. Buluckian, Cleveland, Ohio Application May 11, 1939, Serial No. 273,148

5 Claims. (Cl. 180—78)

This invention relates to an improved instrument panel for automobiles and particularly to an improvement in the construction of the hub of a steering wheel to afford a convenient and attractive arrangement of the instruments and controls mounted therein.

It has been recognized that the most convenient and accessible place for mounting the instruments and controls for an automobile is in the hub of the steering wheel. Efforts to so mount such instruments and controls heretofore have resulted in radical departures in the construction of the conventional steering wheels so that the necessarily enlarged hub of the steering wheel interfered with its operation. Furthermore, the constructions of such instrument panels have afforded no economies in manufacture, and the arrangements of instruments and controls have been confusing and inconvenient.

It is an object of this invention, therefore, to provide a steering wheel having an instrument panel mounted in the hub which is substantially conventional in appearance and construction.

It is another object of this invention to provide an instrument panel in which the instruments and controls are located in separate planes so that the frontal area of the instrument panel is reduced. It is an object of this invention to locate the controls in one plane which is accessible to the automobile operator and to locate the instruments in one or more planes below the plane of the controls so that the instrument, while visible to the operator, cannot be confused with the controls.

It is a still further object of this invention to provide a simple and economical supporting structure for the instrument and controls so that no radical departures in manufacturing operations are required while substantial manufacturing economies are afforded.

Other objects and advantages will be apparent in the following specification and accompanying drawing, in which:

Fig. 1 is a side elevation broken away to show the arrangement of controls, instruments and supporting structures.

Fig. 2 is a front elevation.

Fig. 3 is a section taken along the line 3—3 showing in detail the arrangement of the controls and the construction of the supporting means therefor.

In the drawing, in which like reference characters refer to like parts, 10 is a tubular supporting shield for the steering column 11 which carries the torque necessary to operate the steering gear of the automobile. An enlarged torque-carrying drum 12 is mounted on the steering column 11 and the several spokes 13 of the steering wheel 14 are suitably secured to the drum 12 adjacent to the rim. A fixed tube 15 is located within the steering column 11 and supports a fixed inner drum 16 which is located concentrically within the rotatable torque-carrying drum 12. The rim 17 of the inner drum 16 preferably extends beyond the rim of the outer drum 12.

A housing 20 for a speedometer, considerably smaller in diameter than the inner drum 16, is mounted against the upper inner wall of the inner drum 16. A translucent dial 21 covers the face of the speedometer housing 20 and extends laterally to the inner wall of the drum 16, so that the dial may carry suitable indicating figures for the speedometer and also suitable indicating figures for a gasoline gauge 22 and a motor temperature indicator 23 which instruments are mounted on the side wall of the speedometer housing 20 below the dial 21. Also mounted below the dial 21 on the side wall of the speedometer housing 20 is a generator failure light 24 and an oil pump light 25. Openings are provided in the dial 21 for the speedometer hand 26 and also for the hands of the gasoline gauge 22 and the motor temperature indicator 23. An opening is also provided in the dial 21 for a dial light 27.

A control supporting bracket member 30 is suitably secured to the lower inner wall of the fixed inner drum 16 adjacent to the rim 17. This control supporting bracket member 30 is preferably made of a suitable plastic material, so that the rather intricate construction of the bracket member 30 may be manufactured economically and so that the bracket member will also be electrically non-conducting. The bracket member 30 extends across the lower segment of the inner drum 16 which is not covered by the dial 21 and is preferably provided with an integral shield 31 which extends over the dial light 27 and the opening in the dial 21 for the speedometer hand 26. An ignition switch 32 may be located centrally in the bracket 30. And suitable control knobs 33 and 34 for the light switch and windshield wiper, respectively, are preferably carried by the bracket 30 on either side of the ignition switch 32.

An axially movable horn ring 40 is provided with an annular slot 41 which receives the rim 17 of the drum 16. The ring 40 is spaced from the rim 17 by a suitable resilient cushion 42. The cushion 42 may be of sponge latex, rubber tubing, or the like, and normally spaces the ring 40 from the rim of the outer torque-carrying drum 12. The cushion 42 prevents the ring 40 from being grounded on the inner drum 16 and also prevents dust or the like from entering the inner drum 16. It is apparent, of course, that additional or other means may be used to perform the functions of the cushion 42.

A laterally extending slot 35 extends across the bracket 30 and receives a cross-bar 43 carried by the horn ring 40. The cross-bar 43 may bear against the wall of the slot 35 so that dust may not enter the inner drum 16 at this point. The cross-bar 43 may carry one or more studs 44 journalled in the bracket 30 which serves as a guide for the movement of the horn ring 40. A nut 45 which bears against the bracket 30 limits the outward movement of the stud 44 and the horn ring 40. A lock nut 46 secures a suitable horn lead to the stud 44.

A horn crystal 50 is mounted on the horn ring 40 in the segment extending above the cross-bar 43 and is secured thereto by a bezel or other supporting means provided in the horn ring 40 and the cross-bar 43. The horn crystal is preferably made of transparent unbreakable plastic material. The horn ring 40, cross-bar 43 and crystal 50 thereby constitute a substantially conventional horn button which, with the exception of the opening 51 provided below the cross-bar 43, constitutes substantially the entire frontal area of the steering wheel hub.

The horn is operated in the usual and conventional manner by applying pressure to the crystal 50, ring 40, or cross-bar 43, so that the ring 40 is brought into contact with the rim of the outer drum 12 and the horn circuit is established from the horn lead through the stud 44, cross-bar 43, and ring 40 to the grounded outer drum 12. When pressure is released, the resilient cushion 42 returns the ring 40 to its normal spaced position and breaks the circuit.

From the foregoing, it is apparent that all the manually operated controls in this improved steering wheel instrument panel are located within the plane defined by the steering wheel rim. The steering wheel 14 and the spokes 13 conform to the usual and conventional construction. The horn button, comprising the ring 40, cross-bar 43 and crystal 50, is located in the usual and conventional position. The ignition lock 32, light switch knob 33, and windshield wiper knob 34 are also located within the same plane as the steering wheel and horn button and are readily accessible through the opening 51. The various instruments such as the speedometer, gasoline gauge, etc., while conveniently visible through the crystal 50, are located in another plane below the plane in which the various manually operated controls are located. By so operating the controls and the instruments and by locating them in separate planes spaced axially from each other, the necessary frontal area of the instrument panel is considerably reduced. Furthermore, by this arrangement the frontal area of the instrument panel is devoted exclusively to the manually operated controls and the operator cannot confuse the controls with the instruments.

A steering wheel and instrument panel made according to this invention is assembled in the following manner. The dial 21 is first mounted on the speedometer casing 20, and the dial light 27, gasoline gauge 22 and motor temperature indicator 23 are then placed in position. The additional indicating instruments, such as the generator failure light 24 and oil pump failure light 25, are then mounted on the speedometer casing 20 below the dial 21. The various leads and cables to the several instruments are gathered into a "harness" and dropped into the tube 15. The speedometer casing which carries all the instruments is then secured to the upper wall of the inner drum 16. The horn ring assembly is mounted on the bracket 30 which also carries the other controls 32, 33 and 34, to comprise a control assembly. The various leads to the controls are then gathered into a "harness" and dropped into the tube 15. By suitably securing the bracket 30 to the inner drum 16, the complete instrument panel assembly is formed, which assembly is then dropped into the column 11 and the outer drum 12. Thus, it is apparent that the construction of an instrument panel, according to this invention, greatly simplifies and reduces the complicated manufacturing operations heretofore necessary to assemble an instrument panel.

While the present disclosure is the preferred embodiment of this invention, it is to be understood that this preferred embodiment may be modified within the spirit and scope of this invention. It is also to be understood that this invention is not limited to the preferred embodiment disclosed, either in whole or in part, but only by the appended claims.

What is claimed is:

1. In a combination of the class described, a rotatable steering column, an enlarged torque-carrying outer drum mounted on said column, a steering wheel mounted on said outer drum, a fixed tube located within said column, an inner drum mounted on said tube and located within said outer drum, a control-supporting member extending across a portion of said inner drum and secured thereto, a resiliently mounted horn button assembly extending over and closing off the remaining portion of the inner drum included between the control-supporting member and the rim of the inner drum, said control-supporting member and said horn button assembly being located substantially within the plane defined by said steering wheel, and an instrument assembly secured to said inner drum and axially spaced below said horn button assembly and said control-supporting member.

2. In a combination of the class described, a rotatable torque-carrying outer drum, a steering wheel mounted on said outer drum, a fixed inner drum located within said outer drum, a control-supporting member extending across a portion of said inner drum and secured thereto, a resiliently mounted horn button assembly extending over and closing off the remaining portion of the inner drum included between the control-supporting member and the rim of the inner drum, said control-supporting member being located substantially within the plane defined by said steering wheel, and an instrument assembly visible through said horn button assembly secured to said inner drum and axially spaced below said horn button assembly and said control-supporting member.

3. In a combination of the class described, a fixed inner drum adapted to be located within the hub of a steering wheel, a control-supporting member extending across a portion of said inner drum and secured thereto, a resiliently mounted horn button assembly extending over and closing off the remaining portion of the inner drum included between the control-supporting member and the rim of said inner drum, said control-supporting member being located substantially within the plane defined by said steering wheel, and an instrument assembly visible through said horn button assembly secured to said inner drum and axially spaced below said horn button assembly and said control-supporting member.

4. In a steering wheel instrument panel, an outer rotatable drum, an inner supporting member, and a control assembly mounted on said inner member and extending over said outer drum, said control assembly consisting of a control-supporting bracket carrying manually operated controls and a horn button assembly axially movable with respect to said bracket and resiliently mounted on said inner member to be normally spaced axially away from said outer drum, said horn button assembly comprising a horn ring, a transparent crystal extending across a portion of said horn ring, a cross-bar extending across said horn ring, sad crystal being supported by said ring and cross-bar.

5. In a steering wheel instrument panel, an outer rotatable drum, an inner supporting member, and a control assembly mounted on said inner member and extending over said outer drum, said control assembly consisting of a control-supporting bracket carrying manually operated controls and a horn button assembly axially movable with respect to said bracket and resiliently mounted on said inner member to be normally spaced axially away from said outer drum, said horn assembly comprising a horn ring, a cross-bar extending across said horn ring, and a crystal carried by said ring and cross-bar, and a resilient member carried by said horn ring and adapted to maintain said horn ring normally out of electrical contact with said outer drum.

JOHN F. KENNEDY.